United States Patent
Erez et al.

(10) Patent No.: US 9,118,518 B2
(45) Date of Patent: Aug. 25, 2015

(54) TRANSMISSION SYSTEM WITH ISI CHANNEL AND METHOD OF OPERATING THEREOF

(75) Inventors: Uri Erez, Tel Aviv (IL); Or Ordentlich, Tel Aviv (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 343 days.

(21) Appl. No.: 13/575,562

(22) PCT Filed: Jan. 27, 2011

(86) PCT No.: PCT/IL2011/000095
§ 371 (c)(1),
(2), (4) Date: Jul. 26, 2012

(87) PCT Pub. No.: WO2011/092697
PCT Pub. Date: Aug. 4, 2011

(65) Prior Publication Data
US 2012/0300828 A1    Nov. 29, 2012

Related U.S. Application Data

(60) Provisional application No. 61/298,959, filed on Jan. 28, 2010.

(51) Int. Cl.
*H04L 27/00* (2006.01)
*H04L 25/03* (2006.01)
*H04L 1/00* (2006.01)

(52) U.S. Cl.
CPC ........ *H04L 25/03267* (2013.01); *H04L 1/0059* (2013.01); *H04L 2025/0349* (2013.01); *H04L 2025/03369* (2013.01); *H04L 2025/03598* (2013.01)

(58) Field of Classification Search
CPC ............ H04L 1/0059; H04L 25/03267; H04L 2025/03598; H04L 2025/0349; H04L 2025/03369
USPC ......... 375/230, 233, 259, 265, 285, 295, 316, 375/341, 344
See application file for complete search history.

(56) References Cited

U.S. PATENT DOCUMENTS 6,145,111 A     11/2000   Crozier et al.
7,599,431 B1 *  10/2009   Anderson et al. ............. 375/229
(Continued)

OTHER PUBLICATIONS

R. F. H. Fischer and C. Siegl, On the Relation between Lattice-Reduction-Aided Equalization and Partial-Response Signaling, International Zurich Seminar on Communications, Feb. 22-24, 2006, pp. 34-37, Germany.
(Continued)

*Primary Examiner* — Syed Haider
(74) *Attorney, Agent, or Firm* — Browdy and Neimark, PLLC

(57) ABSTRACT

There is provided a transmission system and method of operating thereof. The method comprises: dividing a data sequence to be transmitted into a plurality of data blocks; encoding one or more data blocks with one or more linear systematic cyclic codes thus giving rise to encoded data blocks; transmitting said encoded data blocks over an ISI transmission channel; upon receiving, applying a linear integer-forcing (IF) equalization to the received data blocks; processing the output of the IF equalization thereby detecting for each encoded data block a valid codeword with maximal likelihood of decoding; and reconstructing the data blocks using the respective detected valid codewords.

24 Claims, 11 Drawing Sheets

Transmission Channel (103)

(56) References Cited

U.S. PATENT DOCUMENTS

| | | | |
|---|---|---|---|
| 2002/0196873 A1* | 12/2002 | Peon et al. | 375/343 |
| 2003/0037300 A1* | 2/2003 | Kondo et al. | 714/794 |
| 2004/0078576 A1* | 4/2004 | Geitinger | 713/181 |
| 2008/0260016 A1* | 10/2008 | Lapointe et al. | 375/233 |

OTHER PUBLICATIONS

Robert F.H. Fischer and Christian Siegl, Lattice-Reduction-Aided Equalization for Transmission over Intersymbol-Interference Channels, Electronics Letters IEEE, 2005, pp. 1-8, Germany.

H. Yao and G. W. Wornell, Lattice-Reduction-Aided Detectors for MIMO Communication Systems, In Proceedings of IEEE Globecom, Nov. 2002, pp. 424-428, Taipei, Taiwan.

G. David Forney, Jr. and Gottfried Ungerboeck, Modulation and Coding forLinear Gaussian Channels, IEEE Trans. Information Theory, Oct. 1998, pp. 2384-2415, vol. 44 No. 6.

A. K. Lenstra, H. W. Lenstra and L. Lov'Asz, Factoring Polynomials with Rational Coefficients, Math. Annalen, 1982, pp. 515-534, vol. 261.

O. Ordentlich and U. Erez, Achieving the Gains Promised by Integer-Forcing Equalization with Binary Codes, Proceedings of the 26th Annual Convention of Electrical and Electronic Engineers in Israel, Nov. 2010, pp. 703-707, Eilat, Israel.

O. Ordentlich and U. Erez, Cyclic Coded Integer-Forcing Equalization, IEEE Information Theory Society, Sep. 2010, pp. 1-22, Israel.

O. Ordentlich and U. Erez, Cyclic Coded Integer-Forcing Equalization, IEEE Information Theory Society, pp. 1-5, Israel, Feb. 2010.

\* cited by examiner

| 1 | 2 | 3 | 4 | 0 | 0 | $\underline{X}$

| 0 | 2 | 4 | 6 | 1 | 0 |  $\underline{X} \cdot 2D \bmod P$

| 0 | 0 | 1 | 2 | 3 | 4 |  $\underline{X} \cdot D^2 \bmod P$

| 1 | 4 | 1 | 5 | 4 | 4 | mod $P$

Figure 6b

TRANSMISSION SYSTEM WITH ISI CHANNEL AND METHOD OF OPERATING THEREOF

CROSS-REFERENCES TO RELATED APPLICATIONS

This application relates to and claims priority from U.S. Provisional Patent Application No. 61/298,959 filed on Jan. 28, 2010 incorporated herein by reference in its entirety.

FIELD OF THE INVENTION

The present invention relates, in general, to methods of digital transmission over communication and/or storage channels and systems thereof, and, more particularly, to digital transmission over ISI channels.

BACKGROUND OF THE INVENTION

Modern digital transmission is characterized by growing signaling rates requiring using the maximum possible channel bandwidth. There are numerous known approaches offering a tradeoff between robustness to channel's noise to power level, complexity and delay. Among undesired phenomena, which increase with the growing rate of transmission, is intersymbol interference (ISI). Intersymbol interference is a common practical impairment found in many transmission and storage systems, including voiceband modems, digital subscriber loop data transmission, storage disks, digital mobile radio channels, digital microwave channels, fiber-optic channels, etc. ISI is a form of distortion of a signal in which one symbol interferes with subsequent symbols having similar effect as noise, thus making the transmission less reliable. The problem of achieving reliable transmission over an ISI channel has been recognized in the art, and has been the subject of many studies over the past decades as, for example:

G. D. Forney, Jr. and G. Ungerboeck, "Modulation and coding for linear Gaussian channels," *IEEE Trans. Information Theory*, vol. IT-44, pp. 2384-2415, October 1998.

Known solutions may be roughly divided into two classes: multi-carrier approaches and single-carrier approaches.

In multi-carrier transmission, the ISI channel is transformed into a set of parallel additive white Gaussian noise (AWGN) subchannels, each subchannel corresponding to a different frequency bin and experiencing a different SNR. This approach has the advantage that the subchannels are (virtually) ISI free, and thus the problems of equalization and decoding are decoupled. However, it has some drawbacks: the alphabet size of the transmitted symbols is considerably enlarged, which in turn makes the approach inapplicable to some media, such as, for example, magnetic recording channels. Furthermore, when channel state information (CSI) is available only at the receiver, bit allocation is precluded, and channel coding and decoding become more difficult, due to the variation of the SNR across subchannels.

Single-carrier approaches try to eliminate most of the ISI without severely increasing noise power, for example with the help of equalization attempting to remove the ISI prior to detection.

While many kinds of equalizers exist, they can be generally divided into 2 types:
1) Linear equalizers followed by symbol-by-symbol decision elements (such as Zero Forcing Equalizers, Minimum Mean Square Error (MMSE) Equalizers, etc.), and
2) Decision Feedback Aided Equalizers. These are non-linear equalizers, where the detector assumes that all previous data symbols were detected correctly and uses them in order to remove all ISI from past symbols, before deciding on the current symbol, using a symbol-by-symbol decision element.

The first type usually cancels most of the ISI by roughly inverting the channel, but may suffer from poor performance due to noise enhancement that is a byproduct of the operation.

The second type is optimal in the sense of Minimum Mean Square Error (MMSE) before the symbol-by-symbol decision element, but has problems with combining with a forward error correcting code (FEC). These problems can be avoided if CSI is available at the transmitter, e.g. by Tomlinson-Harashima precoding which essentially moves the DFE to the transmitter, but is inapplicable if the transmitter has no knowledge of the channel.

SUMMARY OF THE INVENTION

In accordance with certain aspects of the presently disclosed subject matter, there is provided a method of operating a transmission system. The method comprises: dividing a data sequence to be transmitted into a plurality of data blocks; encoding one or more data blocks with one or more linear systematic cyclic codes thus giving rise to encoded data blocks; transmitting said encoded data blocks over an ISI transmission channel; upon receiving, applying a linear integer-forcing (IF) equalization to the received data blocks; processing the output of the IF equalization thereby detecting for each encoded data block a valid codeword with maximal likelihood of decoding; and reconstructing the data blocks using the respective detected valid codeword.

The method can further comprise padding, before encoding, a predefined number of predefined symbols at the end of each data block.

IF equalization can comprise a linear feed-forward equalization as a front end of integer-valued filtering. The reconstruction can be provided with the help of decision-feedback equalization agreed with integer-valued filtering.

In accordance with further aspects of the presently disclosed subject matter, the number of blocks in the plurality of data blocks can correspond to a target transmission rate. The plurality of data blocks can comprise a first set of data blocks and a second set of data blocks, wherein encoding can be provided merely to the data blocks from the second set. Accordingly, the method can further comprise: padding a predefined number of predefined symbols at the end of each data block, wherein padding to the data blocks from the second set is provided before encoding; mapping, before transmitting, the data blocks from the first set and the encoded data blocks from the second set to $2^M$-PAM constellation points with the help of natural labeling; upon receiving, applying a linear integer-forcing (IF) equalization to the received data blocks; and reducing the output of IF equalization modulo-2 before processing for codeword detection.

The method can be applicable to communication system, storage system and other transmission systems.

In accordance with other aspects of the presently disclosed subject matter, there is provided a transmission system comprising a transmitter operatively connected to a receiver with the help of ISI transmission channel. The transmitter is operable to divide a data sequence to be transmitted into a plurality of data blocks; to encode one or more data blocks with one or more linear systematic cyclic code thus giving rise to encoded data blocks; and to transmit said encoded data blocks over the ISI transmission channel; and the receiver is operable to apply a linear integer-forcing (IF) equalization to the received data blocks; to process the output of the IF equalization thereby detecting for each encoded data block a valid codeword with maximal likelihood of decoding; and to reconstruct the data blocks using the respective detected valid codewords.

The receiver can be further operable to apply a linear integer-forcing (IF) equalization to the received data blocks by applying a linear feed-forward equalization as a front end of integer-valued filtering. Further, the receiver can be operable to provide reconstruction with the help of decision-feedback equalization agreed with integer-valued filtering.

The transmitter can be operable without channel state information.

The transmitter can be further operable to divide a data sequence to be transmitted into a plurality of data blocks such that a number of blocks in the plurality of data blocks corresponds to a target transmission rate, and such that said plurality of data blocks comprises a first set of data blocks and a second set of data blocks. Further the transmitter can be operable to provide encoding merely to the data blocks from the second set, to pad a predefined number of predefined symbols at the end of each data block, wherein padding to the data blocks from the second set is provided before encoding; and to map the data blocks from the first set and the encoded data blocks from the second set to $2^M$–PAM constellation points with the help of natural labeling. The receiver, accordingly, can be further operable to reduce the output of IF equalization modulo-2 before processing for codeword detection.

In accordance with other aspects of the presently disclosed subject matter, there is provided a receiver operable to receive via an ISI channel one or more data blocks encoded with one or more linear systematic cyclic code, wherein the receiver is further operable to apply a linear integer-forcing (IF) equalization to the received data blocks; to process the output of the IF equalization thereby detecting for each encoded data block a valid codeword with maximal likelihood of decoding; and to reconstruct the data blocks using the respective detected valid codewords.

In accordance with other aspects of the presently disclosed subject matter, there is provided a receiver operable to receive via an ISI channel one or more data blocks encoded with one or more linear systematic cyclic code, the receiver comprising a linear integer-forcing (IF) equalizer series-connected to a front-end of a decoder operable to detect for each encoded data block a valid codeword with maximal likelihood of decoding, and reconstruction means series-connected to the back-end of the decoder.

In accordance with other aspects of the presently disclosed subject matter, there is provided a method of equalization in a transmission system with ISI channel. The method comprises: encoding a data block with an additional zero padding with a systematic linear cyclic code, transmitting the encoded data block through an ISI channel with additive white Gaussian noise at the receiver; applying a linear feed-forward integer-forcing equalizer thereby transforming the channel into a FIR filter with integer coefficients; reducing the filter output modulo q, where q is the cardinality of the group over which the cyclic code is defined; detecting the closest codeword to the filtered output vector; and reconstructing original data block from the detected codeword.

In accordance with other aspects of the presently disclosed subject matter, there is provided, for use with a transmission system with ISI channel. a method of operating a receiver with additive white Gaussian noise. The method comprises: receiving an encoded data block with an additional zero padding, wherein the encoding provided with a systematic linear cyclic code; applying to the received encoded data block a linear feed-forward integer-forcing equalizer; processing the output of the IF equalization thereby detecting a valid codeword with maximal likelihood of decoding; and reconstructing the data blocks using the respective detected valid codeword.

Among advantages of certain embodiments of the presently disclosed subject matter is preventing the phenomena of error propagation. Decoding may be performed before inverting I(D), thus dramatically reducing the error probability.

The teachings of the presently disclosed subject matter are applicable for every appropriate type of ISI channel, as, by way of non-limiting example, wired communication systems, wireless communication systems, memory devices (such as magnetic recording devices, optical recording devices, etc.) and others.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 6b is schematic illustration of a non-limiting example of a cyclic convolution $x_k \otimes i_k$ over $Z_7$;

DETAILED DESCRIPTION OF EMBODIMENTS

Figure 1:
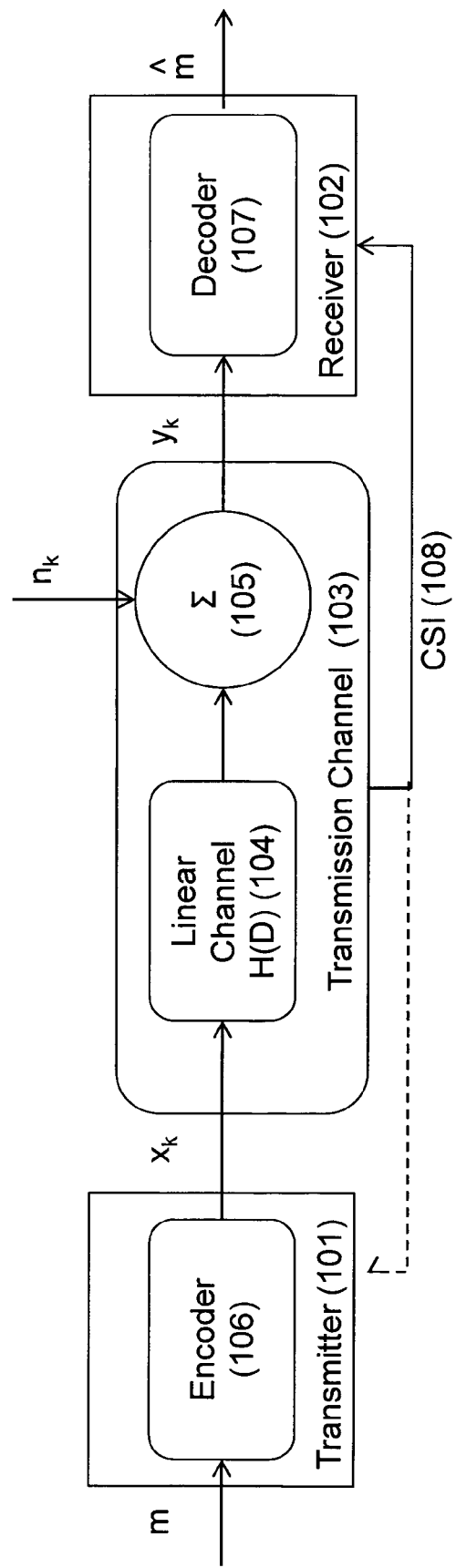
FIG. 1 illustrates a generalized functional block diagram of a transmission system where the presently disclosed subject matter can be implemented.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", "computing", "calculating", "dividing", "applying", "reconstructing" or the like, refer to the action and/or processes of a computer that manipulate and/or transform data into other data, said data represented as physical, such as electronic, quantities and/or such data representing the physical objects. The term "computer" should be expansively construed to cover any kind of electronic system with data processing capabilities.

The operations in accordance with the teachings herein may be performed by a computer specially constructed for the desired purposes or by a general purpose computer specially configured for the desired purpose by a computer program stored in a computer readable storage medium.

The references cited in the background teach many principles of storage virtualization that are applicable to the present invention. Therefore the full contents of these publications are incorporated by reference herein for appropriate teachings of additional or alternative details, features and/or technical background.

Referring to FIG. 1, there is illustrated a generalized functional block diagram of a transmission system where the presently disclosed subject matter can be implemented. The transmission system comprises a transmitter 101, a receiver 102 and a transmission channel 103 therebetween used for successive transmission of data symbols. The transmission channel 103 is represented as a sum of a linear channel H(D) 104 and additive white Gaussian noise (AWGN) 105. The transmitter comprises an encoder 106 and can further comprise (not shown) pulse shaper, transmit filter, A/D converter and/or other signal processing means. The receiver comprises a decoder 104, and can further comprise a sampler and/or other not shown processing means.

The transmission channel can be a communication channel, a storage channel, etc. By way of non-limiting example, the transmitter can be a base station in a wireless communication network, and a receiver can be a mobile handset. Alternatively, the mobile handset can operate as a transmitter while a base station can operate as a receiver. By way of another non-limiting example, a storage apparatus (e.g. optical disk, magnetic disk, etc.) can be a receiver or a transmitter, depending on whether it operates in a recording or readout mode. The transmission channel can be represented as a discrete-time linear equivalent Gaussian channel described by $$y_k = x_k + \sum_{m \neq 0} h_m x_{k-m} + n_k = x_k + ISI_k + n_k,$$

where $x_k$ is sequence of data symbols at the output of the encoder, $y_k$ is sequence of data symbols at the input of the decoder, $\{h_m\}$ are channel coefficients, $n_k$ is an additive white Gaussian noise (AWGN), $ISI_k$ is intersymbol interference (ISI) resulting from other data symbols. Using D-transform notation the channel can be represented as Y(D)=H(D)X(D)+N(D).

In such a channel, when attempting to detect the transmitted data sequence, $x_k$, there are two noise sources that corrupt the data signal: the additive noise N (D), and the ISI.

The channel can be further characterized by the availability of Channel State Information (CSI). In different embodiments of the channel the CSI (108) can be available to the transmitter and the receiver alike or CSI can be available to the receiver only.

There are several known approaches in the art trying to find a good compromise between canceling ISI and enhancing the noise as little as possible. For example, one of the approaches uses a receiver comprising a linear equalizer followed by a decoder. Such a linear equalizer can be configured as a Zero-Forcing (ZF) equalizer, which forces all ISI to be zero. This corresponds to taking the front end (linear) filter to be $$A_{ZF}(D) = \frac{1}{H(D)},$$

resulting in the equalized channel response G(D)=1. The induced noise enhancement can be large, especially when H(D) has zeros near the unit circle. A variant that takes into account both ISI and noise enhancement is the linear MMSE equalizer $$A_{MMSE-LE}(D) = \frac{H^*(D^{-*})}{H(D)H^*(D^{-*}) + 1/SNR}.$$

The MMSE-LE suffers from smaller (and in particular bounded) noise enhancement while allowing some residual ISI. The MMSE criterion is equivalent to maximizing the signal-to-interference-plus-noise ratio (SINR) at the slicer input.

Figure 2:
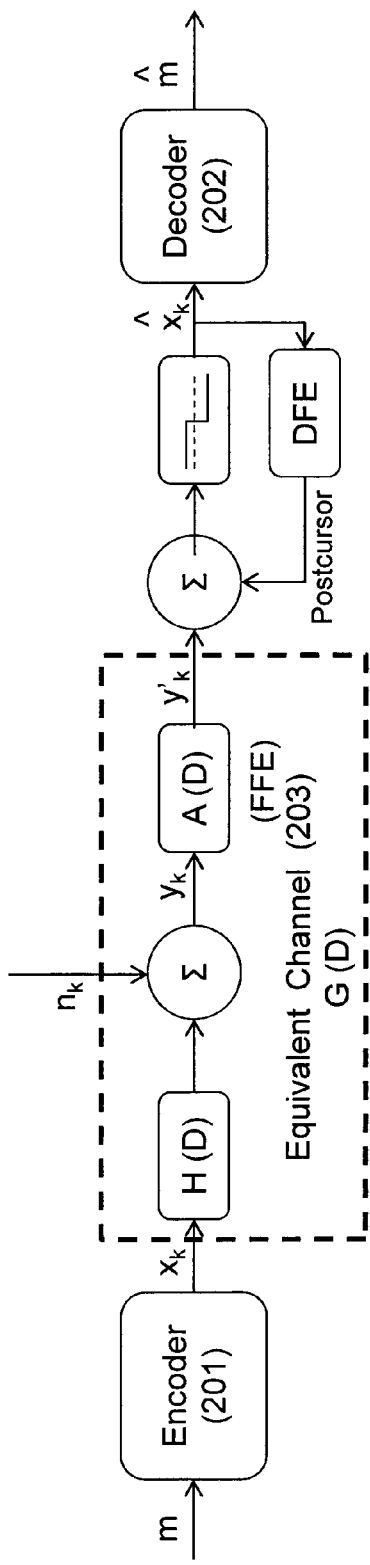
FIG. 2 illustrates a generalized functional block diagram of a transmission system with decision-feedback equalization (DFE) as known in the art.
Figure 2:
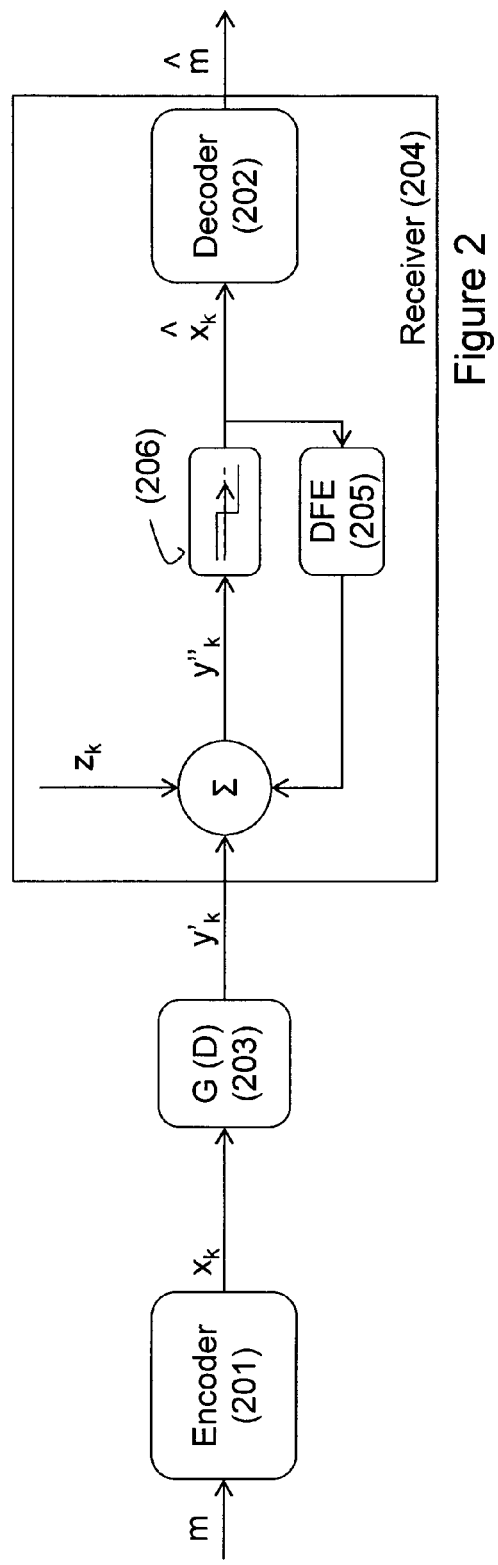

Referring to FIG. 2, there is schematically illustrated the transmission system with receiver 204 comprising a decision-feedback equalizer 205 operatively coupled to a slicer (symbol-by-symbol decision element) 206. The decision-feedback equalization (DFE) is based on using previously detected symbols in order to cancel the induced ISI from the symbol entering the slicer. In this approach, if all previous data symbols are detected without error, then postcursor ISI can be removed. The output of the feed-forward equalization (FFE) in FIG. 2 can be presented as $$y'_k = x_k * g_k + z_k$$
$$= x_k + \sum_{m=-\infty}^{-1} x_{k-m} g_m + \sum_{m=1}^{\infty} x_{k-m} g_m + z_k$$
$$= x_k + ISI_k^{PRE} + ISI_k^{POST} + z_k.$$

where G(D) represents the equivalent channel after the FFE and $z_k$ is filtered Gaussian noise. The DFE then subtracts $\hat{ISI}_k^{POST} = \sum_{m=1}^{\infty} \hat{x}_{k-m} g_m$ from $y'_k$, where $\hat{x}_k$ are decisions on past transmitted symbols, giving rise (assuming correct past decisions) to the equivalent channel $$y''_k = x_k + \sum_{m=-1}^{-\infty} x_{k-m} g_m + z_k.$$

When applied correctly, DFE may be optimal in the sense of minimizing the mean square error before the symbol-by-symbol decision assuming error-free symbols entering the feedback loop. However, this method suffers from error propagation, since a detection error of a certain symbol is likely to cause detection errors at subsequent symbols, leading to an error burst.

Figure 3:
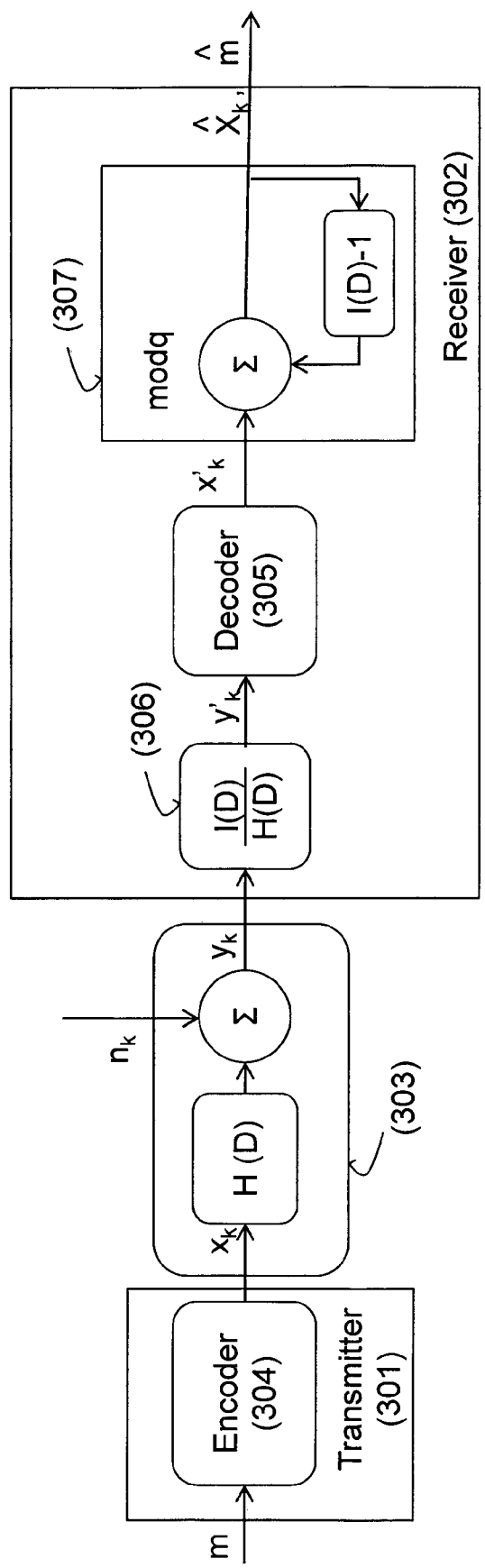
FIG. 3 illustrates a generalized functional diagram of a single-carrier transmission system with Integer-Forcing decision-feedback equalization (IF-DFE) in accordance with certain embodiments of the currently presented subject matter.

Referring to FIG. 3, there is illustrated a generalized functional block diagram of a transmission system in accordance with certain embodiments of the presently disclosed subject matter. For purposes of illustration only, the following description is made with reference to real-valued channels and transmission of real symbols. Those skilled in the art will readily appreciate that the teachings of the disclosed subject matter are applicable in a similar manner to complex channels and/or transmission.

The transmission system comprises a transmitter 301, a receiver 302 and an ISI transmission channel 303. The transmitter 301 comprises an encoder 303 configured to divide the data sequence $x_k$ into data blocks, to encode these blocks with a linear systematic cyclic code(s), and to transmit the blocks over the ISI channel 303. The transmitter can be configured to operate without CSI (channel state information). As will be further detailed with reference to FIG. 8, the encoder can be configured to define the number of data blocks in accordance with a target transmission rate, and to encode only part of these data blocks.

The receiver 302 comprises a feed-forward linear equalizer (FFE) 306 series-connected to a front-end of a decoder 305. A back-end of the decoder 305 is series-connected to a decision-feedback equalizer (DFE) 307. The FFE equalizer 306 is configured as an Integer Forcing Equalizer (IF), this means that rather than canceling all NI, the equalizer works in a manner such that all interferences from previous symbols sum up to an integer.

The (IF-FFE) equalizer comprises an integer-valued filter I(D). If it is assumed that the data symbols are taken from a Pulse Amplitude Modulation (PAM) (or in the case of complex transmission Quadrature Amplitude Modulation (QAM)) constellation of size q consisting of the integers {0, 1, ..., q−1}, which may be identified as the ring Zq, restricting the ISI to take only integer values can be achieved by equalizing the channel to an impulse response I(D), such that I(D) is a monic polynomial with integer coefficients.

The decoder 305 is further configured to operate with data sequence X(D) encoded by using cyclic codes. The IF-FFE equalization is characterized by the fact that if transmitted data is taken from a cyclic code, then the output of the equalized channel is also a member of the respective codebook.

As will be further detailed with reference to FIGS. 4-8, the decoder 305 detects X'(D)=X(D)I(D), wherein X(D) has to be further reconstructed from X'(D). By way of non-limiting example, this can be done by passing X'(D) through 1/I(D) (e.g. with the help of a DFE-like system or by other reconstruction means). The illustrated DFE equalizer 307 is configured in agreement with IF-FFE equalizer and, thus, does not require stability of 1/I(D).

In accordance with certain embodiments of the presently disclosed subject matter, the receiver 302 provides decoding (soft or hard) before decision feedback is performed, i.e. the correction of detection errors of X'(D) is provided before reconstructing X(D). The change of order between decoding and ISI removal ensures that reliable decisions enter the DFE loop.

For purpose of illustration only, the following description is made with reference to zero-forcing integer-forcing (ZF-IF) feed-forward equalizer (FFE) which can be described as $$A_{ZF-IF}(D) = \frac{I(D)}{H(D)}.$$

Those skilled in the art will readily appreciate that the teachings of the disclosed subject matter are applicable in a similar manner to other integer forcing FFE equalizers, for example, to Minimum Mean Square Error integer-forcing (MMSE-IF) feed-forward equalizer (FFE) which can be described as $$A_{MMSE-IF}(D) = b_0 \frac{I(D)H^*(D^{-*})}{H(D)H^*(D^{-*}) + \frac{1}{SNR}}.$$

The role of the factor $b_0$ is to ensure that the filter's output is unbiased, and it should be chosen as follows:

$$b_0 = \frac{1}{\frac{1}{2\pi}\int_{-\pi}^{\pi} \frac{|H(e^{j\omega})|^2}{|H(e^{j\omega})|^2 + \frac{1}{SNR}} d\omega}$$

The transmission system illustrated in FIG. 3 is based on the combination between cyclic forward error correcting codes at the transmitter, and an Integer Forcing linear equalizer at the receiver. A data block x is encoded with a cyclic code, and transmitted with an additional zero padding (or cyclic prefix) through an ISI channel, with additive white Gaussian noise at the receiver. The receiver's front end consists of a linear equalizer, which transforms the channel into a FIR filter with integer coefficients. This FIR filter is chosen in a manner that reduces the noise enhancement that would have occurred if the channel were equalized to an impulse (as in Zero Forcing Equalizers). The filter's output is reduced modulo q, where q is the cardinality of the ring over which the cyclic code is defined. The closest codeword to the filtered output vector is found in a soft decoding manner, or a hard decoding manner. The original data block x is then (deterministically) reconstructed from the result. The proposed equalization scheme enables canceling ISI with only a slight enhancement of the additive noise, and is easily combined with FEC. The proposed scheme does not require any knowledge of the channel's state at the transmitter side.

Those versed in the art will readily appreciate that the invention is not bound by the specific architecture illustrated in FIG. 3; equivalent and/or modified functionality can be consolidated or divided in another manner and can be implemented in any appropriate combination of software, firmware and hardware.

Figure 4:
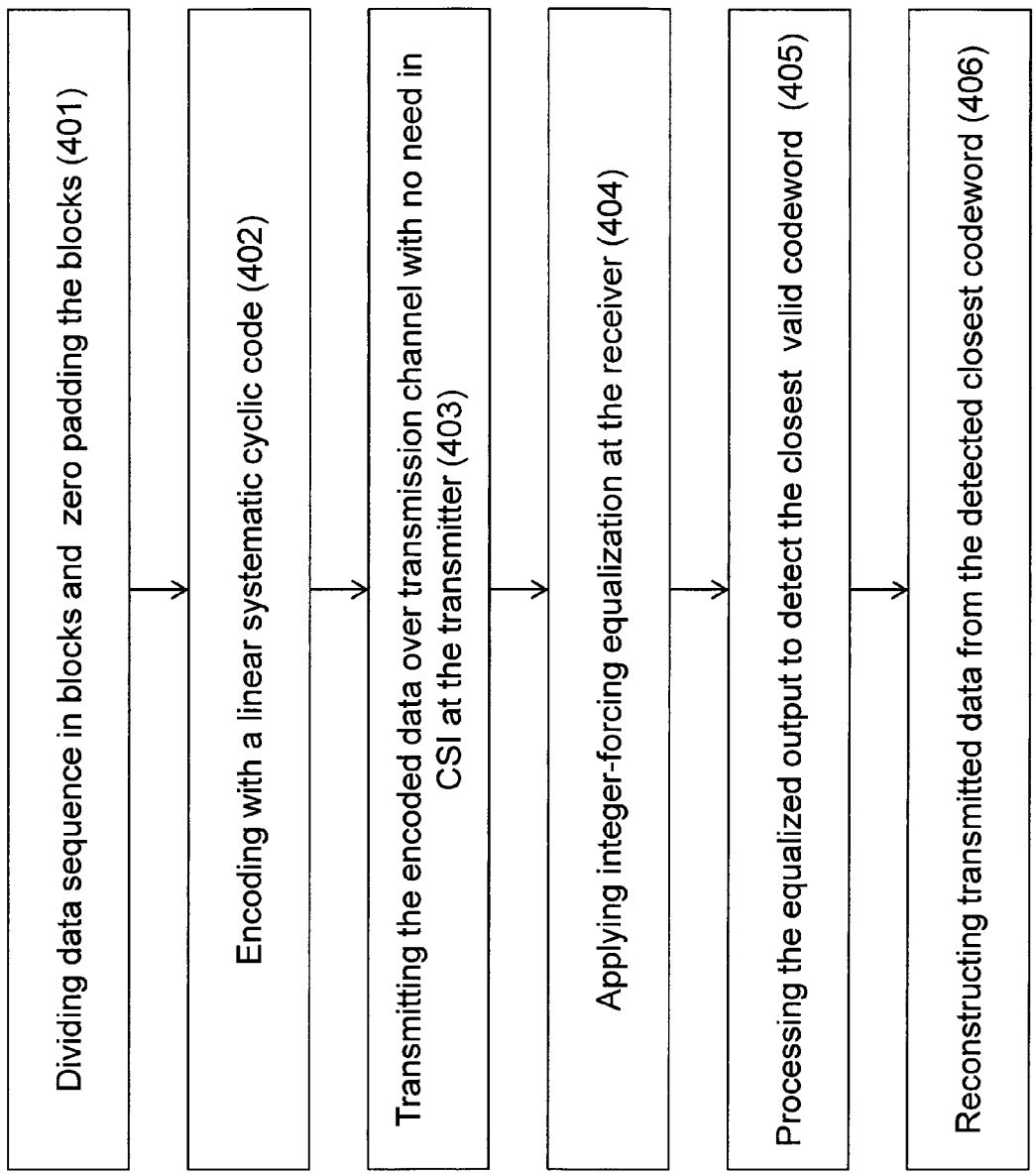
FIG. 4 illustrates a generalized flow-chart of operating the transmission system in accordance with certain embodiments of the presently disclosed subject matter.

Referring to FIG. 4, there is provided a generalized flowchart of operating the transmission system in accordance with certain embodiments of the presently disclosed subject matter. The data sequence $x_k$ is divided into data blocks (401), wherein the transmitter pads each data block with L zeros (or other predefined symbols) at its end. These blocks are encoded (402) at the transmitter with a linear systematic cyclic codes and transmitted (403) over the ISI channel without CSI (channel state information) at the transmitter. Integer-forcing equalization is applied (404) at the receiver to the transmitted data. The output of the IF equalization is processed into a valid codeword (which is not necessarily the transmitted codeword), thereby detecting (405) for each encoded data block the valid codeword with maximal likelihood of decoding (i.e. the closest valid codeword in case of AWGN channel). Encoding and decoding each data block can be provided independently.

The original transmitted data are reconstructed (406) from the detected closest valid codeword. Accordingly, decoding is provided before decision feedback (or other reconstruction technique) is performed, thus circumventing the error propagation problem with no need in incorporating an interleaver or other additional blocks.

Figure 5:
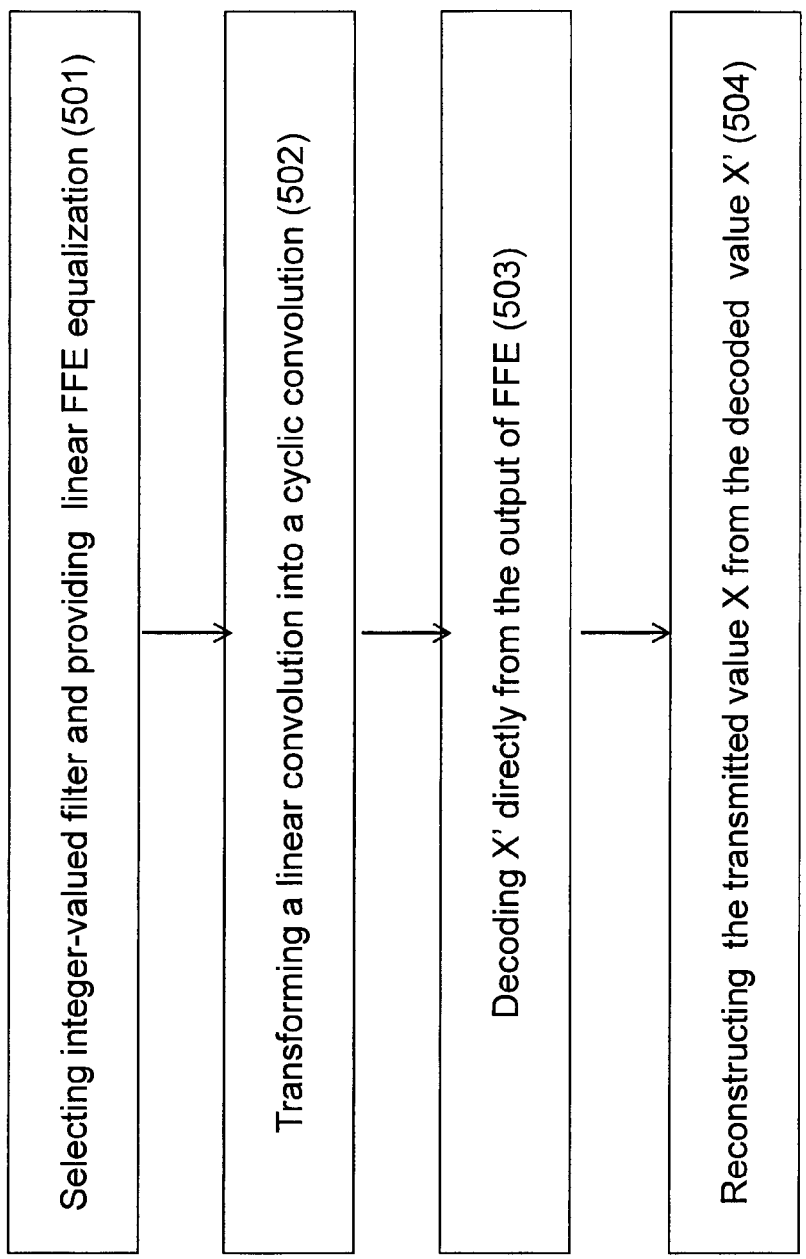
FIG. 5 illustrates a generalized flow-chart of operating the receiver in accordance with certain embodiments of the presently disclosed subject matter.

The method of operating the transmission system is further detailed with reference to FIG. 5, illustrating a generalized flow-chart of operating the receiver in accordance with certain embodiments of the presently disclosed subject matter.

The receiver is configured to select a monic integer-valued filter $I(D)=\Sigma_{j=0}^{L} i_j D^j$ (with $i_0=1$), where the vector of coefficients of $I(D)$ is denoted by $i=[i_0\ i_1\ \ldots\ i_L]$ (finding a good integer-valued filter $I(D)$ with $L+1$ coefficients is further detailed with reference to FIG. 7), and to apply (501) the linear FFE equalizer as the front-end of the filter:

$$A_{ZF-IF}(D) = \frac{I(D)}{H(D)}.$$

The equalizer's output is $$Y'(D)=X(D)I(D)+Z(D)=X'(D)+Z(D)$$

where $$Z(D) = N(D)\frac{I(D)}{H(D)}$$

is colored Gaussian noise, and $X'(D)=X(D)I(D)$.

In the time domain it can be presented as $$y'_k = x_k + \sum_{m=1}^{L} i_m x_{k-m} + z_k.$$

The receiver is further configured to use systematic cyclic linear codes in order to find and correct errors in $X'(D)$ before reconstructing $X(D)$ from it. The term "cyclic code" should be expansively construed to cover any linear block code C of length N over $Z_q$ characterized by that for every codeword $x \in C$, all cyclic shifts of x are also codewords in C. The property of cyclic codes is that if C is a cyclic code of length N over $Z_q$, then for any vector i with integer entries $C \otimes i \subseteq C$., where $\otimes$ denotes cyclic convolution of length N. Thus, C is closed under integer-valued cyclic convolution over $Z_q$. The systematic cyclic codes are further characterized in that the input data to the encoder is embedded in the encoded output.

The receiver is further configured to force (502) the linear convolution $x_k * i_k$ over R, to be a cyclic convolution $x_k \otimes i_k$ with operations over $Z_q$, thereby enabling decoding (503) $x'=x \otimes i$ mod q directly from the output y', and then reconstructing (504) x from it. It is important to note that in order to reconstruct x from $x \otimes i$ mod q, all elements of x must be in $Z_q$. Nevertheless, the elements of i need only be integers but need not necessarily be restricted to $Z_q$.

SNR can be further defined as $$SNR_{ZF-IF-DFE} = \frac{\sigma_x^2}{\sigma_{\tilde{x}}^2} = \frac{\sigma_x^2}{\frac{1}{2\pi}\int_{-\pi}^{\pi}\frac{|I(e^{jw})|^2}{|H(e^{jw})|^2}dw}.$$

Hence, $I(D)$ should be chosen so as to maximize $SNR_{ZF-IF-DFE}$. Using the cyclic codes justifies the definition of SNR as excluding the residual ISI as noise.

As was detailed with reference to FIG. 4, the transmitter encodes the data blocks with linear cyclic codes. Since a linear cyclic code over $Z_q$ is closed under integer valued cyclic convolution with all operations performed over $Z_q$, $x'=x \otimes i$ mod q is a valid codeword. This implies that when transforming the linear convolution performed by the FFE into cyclic convolution, one will get a valid codeword (plus Gaussian noise).

Transforming the linear convolution into cyclic convolution may be accomplished in a way similar to used in DMT/OFDM transmission. However, unlike DMT/OFDM modulation, the alphabet of the transmitted symbols is not expanded with respect to the data symbols and furthermore the resulting SNR does not vary within the block.

Referring back to FIG. 4, the transmitter can comprise a systematic cyclic encoder configured such that the last K symbols of a [N,K] cyclic block code are the data symbols and the first N−K symbols are redundancy symbols. The transmitter further pads each data block with L zeros at its end. Thus, all codewords end with L zeros. The effective rate therefore is reduced to $$\frac{K-L}{N}.$$

Due to the zero padding, if to take only the first N samples of the output of the FFE reduced modulo q, then $$y_{k'} \bmod q = [(x \otimes i)_k + z_k] \bmod q, \text{ for } k=1,\ldots,N.$$

Since the result of the cyclic convolution is itself a codeword, the channel decoder can be applied directly to it. Assuming correct decoding, $x_k$ is further reconstructed from the decoded result of the cyclic convolution. This can be done in a recursive way by applying a DFE as shown in FIG. 3. Since the last L values of $x_k$ are known, $x_k$ can be found for every $k=1,\ldots,N-L$. All operations of the DFE are carried over $Z_q$. Since $I(D)$ is monic, it is always possible to reconstruct $x_k$ regardless of q and the choice of the integer-valued filter.

Figure 6A:
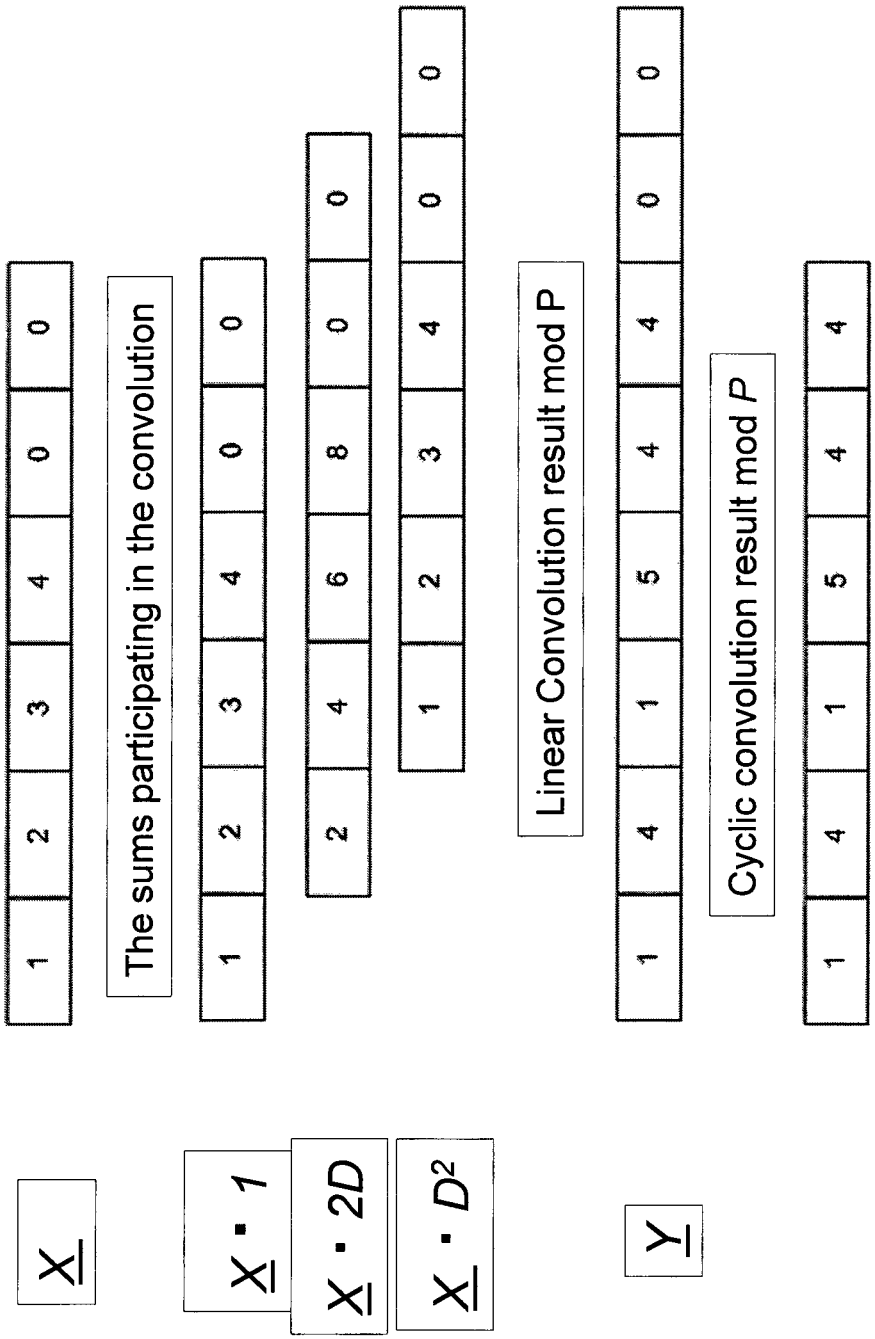
FIG. 6a is a schematic illustration of a non-limiting example of forcing a linear convolution $x_k * i_k$ over R into a cyclic convolution $x_k \otimes i_k$ over $Z_7$.

The non-limiting example of forcing a linear convolution $x_k * i_k$ over R into a cyclic convolution $x_k \otimes i_k$ over Z, is illustrated in FIG. 6a (in the illustrated example $I(D)=1+2D+D^2$). The zero padding also ensures that when a new data block is transmitted, the "channel's memory" is empty, i.e., there is no ISI between consecutive blocks. FIG. 6b further schematically illustrates a non-limiting example of a cyclic convolution $x_k \otimes i_k$ over $Z_7$.

Those versed in the art will readily appreciate that the linear convolution can be transformed into cyclic convolution with the help of a cyclic prefix instead of zero padding of the transmitted codeword's end. Accordingly, a data block can be encoded with the linear cyclic code, then the transmitter transmits the last L symbols of the encoded block, where L is the length of $I(D)$, and further transmits the whole encoded block. In the receiver, the decoder will ignore the first L received symbols and the last L received symbols, and will find the closest codeword to the remainder of the received sequence.

In case of using the cyclic prefix as described above, the reconstruction can be provided, by way of non-limiting example, by building a circulant matrix $I_{circulant}$ such that $x \otimes i = I_{circulant} x$. If q is prime and further $I_{circulant}$ is invertible over $Z_q$, we can multiply the result of the cyclic convolution by its inverse and find x.

Figure 7:
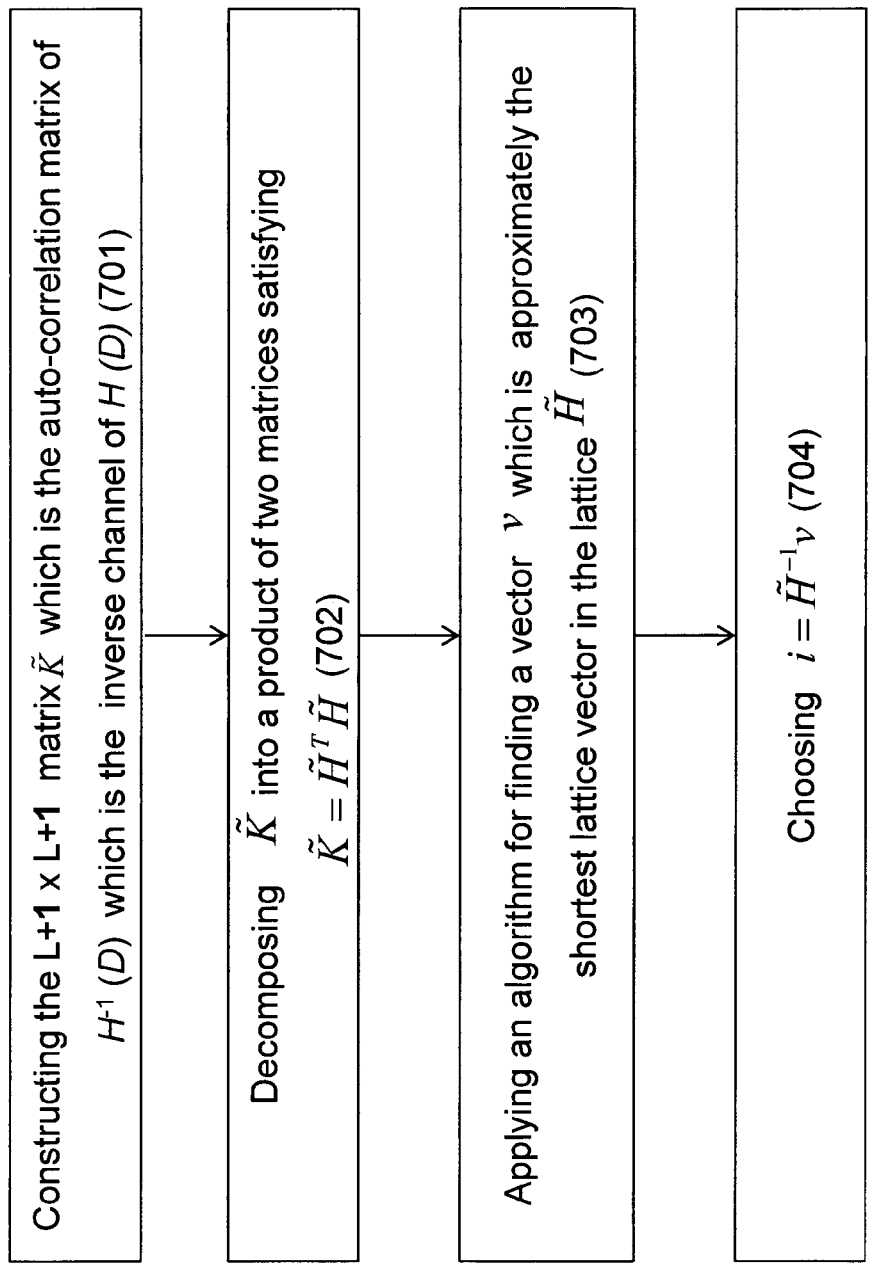
FIG. 7 illustrates a generalized flow-chart of finding a good integer-valued filter with L+1 coefficients in accordance with certain embodiments of the presently disclosed subject matter.

Referring to FIG. 7, there is illustrated a generalized flow-chart of finding a good integer-valued filter with L+1 coefficients in accordance with certain embodiments of the presently disclosed subject matter.

As was detailed with reference to FIG. 5, the noise variance at the output of the IF front-end filter is $$\sigma^2_{ZF-IF-DFE} = \frac{1}{2\pi} \int_{-\pi}^{\pi} \frac{|I(e^{j\omega})|^2}{|H(e^{j\omega})|^2} d\omega. \quad (1)$$

Further, $$\frac{1}{|H(e^{j\omega})|^2} = \sum_{m=-\infty}^{\infty} k_m e^{j\omega m}$$

may be written as a Fourier series $$\frac{1}{|H(e^{j\omega})|^2} = \sum_{m=-\infty}^{\infty} k_m e^{j\omega m} \quad (2)$$

where $$k_m = \frac{1}{2\pi} \int_{-\pi}^{\pi} \frac{1}{|H(e^{j\omega})|^2} e^{-jm\omega} d\omega. \quad (3)$$

In accordance with further aspects of the presently disclosed subject matter, the optimal integer-valued filter I(D) shall be configured such that the noise enhancement experienced by the ZF-IF equalizer for a given channel H(D) with a finite (effective) length is minimized. Accordingly, the receiver can be further configured to adapt the FFE filter so that it finds a good integer-valued filter with L+1 coefficients before providing the integer-valued filtering.

Accordingly, the receiver is configured to construct (701) L+1×L+1 matrix $\tilde{K}$ which is the auto-correlation matrix of $H^{-1}(D)$ which is the inverse channel of H(D).

Using straightforward algebra the noise variance (1) may be written as a quadratic form $$\sigma^2_{ZF-IF-DFE} = i \begin{bmatrix} k_0 & k_{-1} & k_{-2} & \ldots & k_{-L} \\ k_1 & k_0 & k_{-1} & \ldots & k_{-(L-1)} \\ \vdots & \vdots & \vdots & \ddots & \vdots \\ k_L & k_{L-1} & k_{L-2} & \ldots & k_0 \end{bmatrix} i^T \quad (4)$$

$$= i \tilde{K} i^T,$$

where the matrix $\tilde{K}$ is a Toeplitz matrix, whose entries are the Fourier coefficients of $$\frac{1}{|H(e^{j\omega})|^2}$$

given in (3).

The receiver is further configured to decompose (702) the matrix $\tilde{K}$ into a product of two matrices satisfying $\tilde{K} = \tilde{H}^T \tilde{H}$. Let $\tilde{H}$ be a matrix satisfying $$\tilde{K} = \tilde{H}^T \tilde{H}. \quad (5)$$

We therefore have $$\Sigma_{ZF-IF-DFE}^2 = i \tilde{H} i^T = i \tilde{H}^T \tilde{H} i^T = \|\tilde{H} i^T\|^2. \quad (6)$$

Equation (6) implies that finding the optimal (ZF) integer-valued filter I(D) is equivalent to finding the shortest vector in the lattice $\Lambda(\tilde{H})$, which is composed of all integral combinations of the columns of $\tilde{H}$, i.e., $$\Lambda(\tilde{H}) = \{\lambda = \tilde{H} i : i \in Z^{L+1}\}. \quad (7)$$

Accordingly, the receiver applies an algorithm for finding a vector v which is an approximate solution to the problem of finding the shortest lattice vector in the lattice $\tilde{H}$.

Finding the shortest lattice vector can be provided with the help of known suboptimal algorithms for finding a short lattice basis (as, by way of non-limiting example, LLL algorithm disclosed in A. K. Lenstra, H. W. Lenstra and L. Lov'asz, "Factoring polynomials with rational coefficients," Math. Annalen, vol. 261, pp. 515-534, 1982).

The LLL algorithm can be applied on $\tilde{H}$ in order to find a "good" integer-valued filter I(D). The algorithm's result is a new basis for $\tilde{H}$, this new basis to be used for finding the shortest vector v and selection (704) $i = \tilde{H}^{-1} v$.

Figure 8:
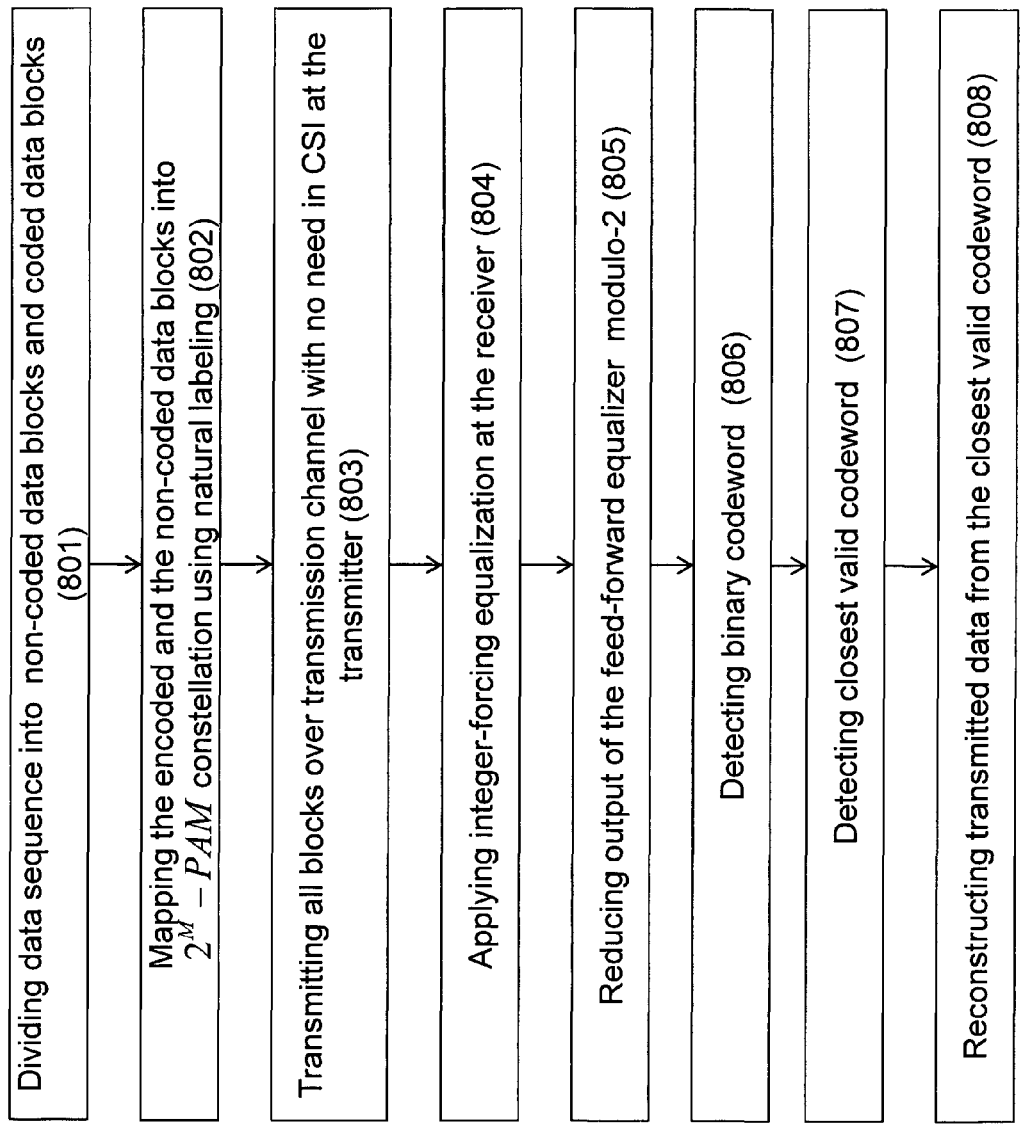
FIG. 8 illustrates a generalized flow-chart of operating the transmission system at a high transmission rate in accordance with certain embodiments of the presently disclosed subject matter.

The transmission system detailed with reference to FIGS. 3-7 can be effectively used at high transmission rates. Referring to FIG. 8, there is illustrated a generalized flow-chart of operating the transmission system at high rates in accordance with certain embodiments of the presently disclosed subject matter.

In order to achieve high transmission rates, the transmitter can be configured to transmit a combination of coded and non-coded bits. The transmitter divides (801) each data sequence of N·R bits into M−1 blocks of N bits and one block of N·r bits, where M is integer corresponding to a target $2^M$−PAM constellation, and 0<r<1. The encoder encodes the block of N·r bits with the help of systematic linear cyclic codes.

The combination of coded and non-coded bits is further mapped (802) to $2^M$−PAM constellation points by natural labeling. Accordingly, the transmitter transmits (803)

$$x = x_c + \sum_{b=1}^{M-1} x_{u_b} 2^b$$

where $x_c$ is a codeword of length N from the binary linear cyclic code C, and $x_{u_b}$, b=1, ..., M−1, are blocks of non-coded information bits having the same length (N) as that of $x_c$. The transmitted signal, in effect, would be c(x−d) where d is a constant chosen such that the average energy of the constellation points is minimized, and c is a constant chosen such that the power constraint is met. For sake of simplicity, the further description omits these normalization constants.

The receiver applies (804) integer-forcing equalization to the transmitted data blocks. The receiver is configured to detect $(x \otimes i) \mod 2^M$ without error, and to apply the DFE (with all operations carried over $Z_{2^M}$) in order to reconstruct x. Reconstruction of x requires knowledge of the value of its last samples. Therefore the last L non-coded bits as well as the last L coded bits need to be zero-padded.

The provided labeling retains the closure property under integer-valued cyclic convolution, i.e. if x∈Λ then (x⊗i) mod $2^M$∈Λ, where $\Lambda = \{x | x_c \in C, x_{u_b} \in Z_2^N, b=1, \ldots, M-1\}$, for $x_c \in C$.

When using natural labeling, the result of the cyclic convolution reduced modulo $2^M$ can be written as $$(x \otimes i) \bmod 2^M = x_0 + \sum_{b=1}^{M-1} x_b 2^b,$$

for some vectors $x_0, x_1, \ldots, x_{M-1} \in Z_2^N$. If $x_0 \in C$ then (x⊗i) mod $2^M$∈Λ. Accordingly, $$\begin{aligned} x_0 &= ((x \otimes i) \bmod 2^M) \bmod 2 \\ &= (x \otimes i) \bmod 2 \\ &= \left(\left(x_c + \sum_{b=1}^{M-1} x_{u_b} 2^b\right) \otimes i\right) \bmod 2 \\ &= \left(x_c \otimes i + \sum_{b=1}^{M-1} 2^b (x_{u_b} \otimes i)\right) \bmod 2 \\ &\stackrel{(a)}{=} (x_c \otimes i) \bmod 2 \stackrel{(b)}{\in} C, \end{aligned}$$

where (a) holds since $(x_{u_b} \otimes i) \in Z^N$, and (b) holds because C is a linear cyclic binary codebook. Thus $x_0$ is indeed a codeword.

A corrupted version of x⊗i is obtained at the equalizer's output, and $x_0$ (plus folded Gaussian noise) is obtained after reducing modulo 2. Since $x_0 \in C$, it can be decoded before preceding to detect the non-coded bits. Accordingly, the output of the feed-forward equalizer (FFE) is reduced (805) modulo-2. The receiver decodes (806) the binary codeword, and further decodes (807) the closest valid codeword as following: in coordinates where the value of the decoded binary codeword is 1, the output of the FFE equalizer is rounded to the nearest odd integer. In coordinates where the value of the decoded binary codeword is 0, the output of the FFE equalizer is rounded to the nearest even integer. The receiver further reconstructs the transmitted data with the help of detected codeword (807).

A complete knowledge of $x_0$ divides the constellation into two cosets, which makes the distinction between two points from the same coset easier than the distinction between two points of the full constellation, thus doubling the Euclidean minimum distance in the constellation. Therefore the receiver can be configured first to decode $x_0$ and then to detect the non-coded bits. By way of non-limiting example, this operation can be provided with the help of a slicer with double step size detailed in the article by O. Ordentlich and U. Erez, "Achieving the gains promised by Integer-Forcing equalization with binary codes," in *Proceedings of the 26th Annual Convention of Electrical and Electronic Engineers in Israel*, (Eilat, Israel), November 2010 and incorporated herewith by reference in its entirety.

Figure 9:
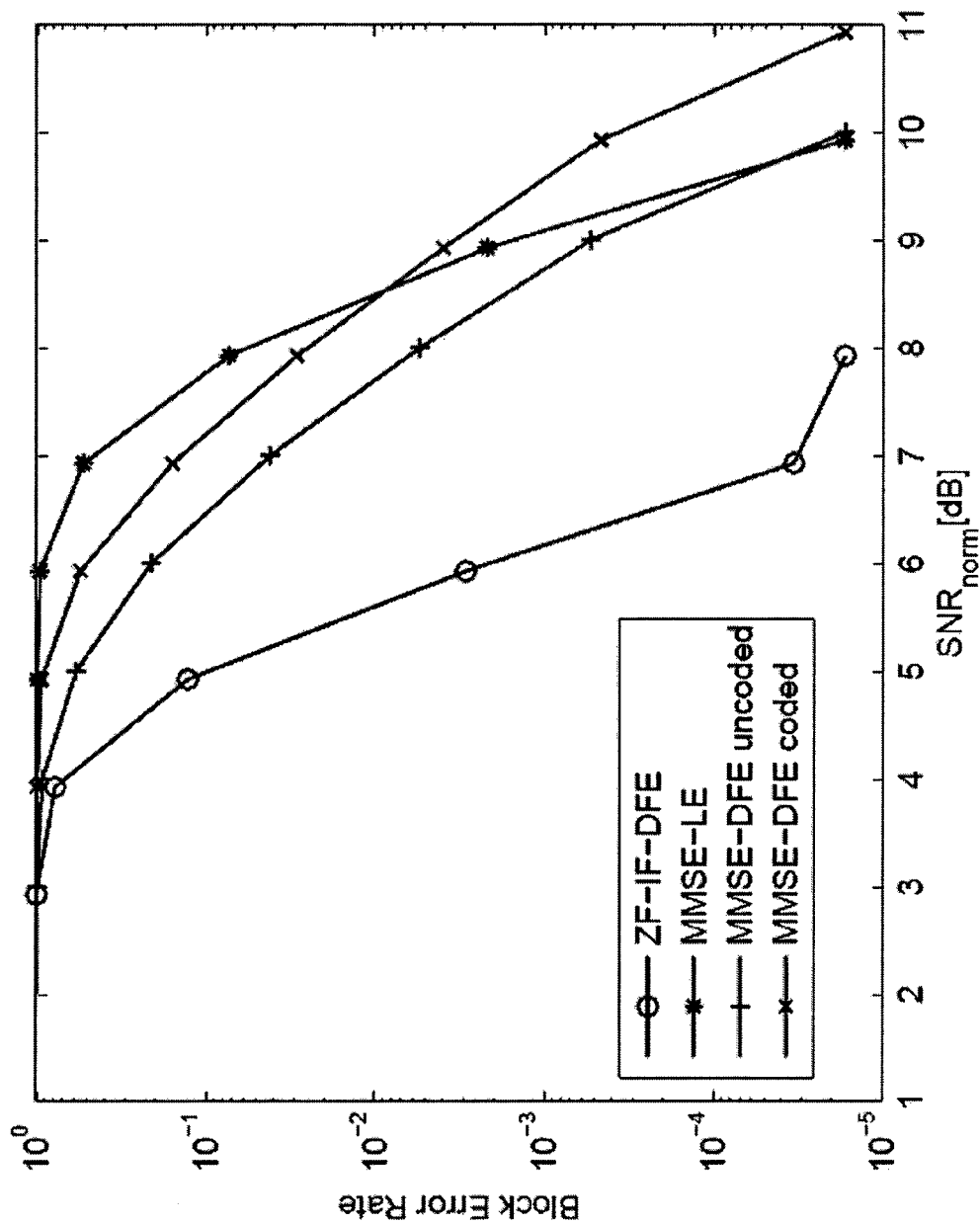
FIG. 9 illustrates a non-limiting example of block error rate over SNR calculated for transmission systems with ISI channel and implementing, respectively, MMSE linear equalizer, coded DFE, un-coded DFE and for the transmission systems configured in accordance with certain embodiments of the presently disclosed subject matter.

Referring to FIG. 9, there is illustrated a non-limiting example of comparing block error rate over SNR calculated for transmission systems ISI channel and implementing, respectively, MMSE linear equalizer, coded DFE, un-coded DFE and a transmission system in accordance with certain embodiments of the presently disclosed subject matter (ZF-IF-DFE).

The block error rate has been calculated for each of the systems for the ISI channel: $H_1(D)=1+0.894D+0.814D^2+0.239D^3-0.070D^4+0.036D^5-0.022D^6$. Since the rate of the coded schemes is different than the rate of the non-coded transmission used for the MMSE-DFE scheme, comparing the performances of all schemes over the same SNR is not viable. Therefore the block error rate of each scheme is plotted vs. its $SNR_{norm}$. The value of $SNR_{norm}$ in dB measures how far a given coding scheme is operating from the Shannon limit corresponding to its transmission rate, and is defined as $$SNR_{norm} = \frac{SNR}{2^\rho - 1},$$

where ρ is the spectral efficiency of the transmission measured as the number of bits transmitted over two real dimensions. It can be seen that for the exemplified channel, the transmission system in accordance with certain embodiments (ZF-IF-DFE) of the presently disclosed subject matter significantly outperforms the three other schemes.

Figure 10:
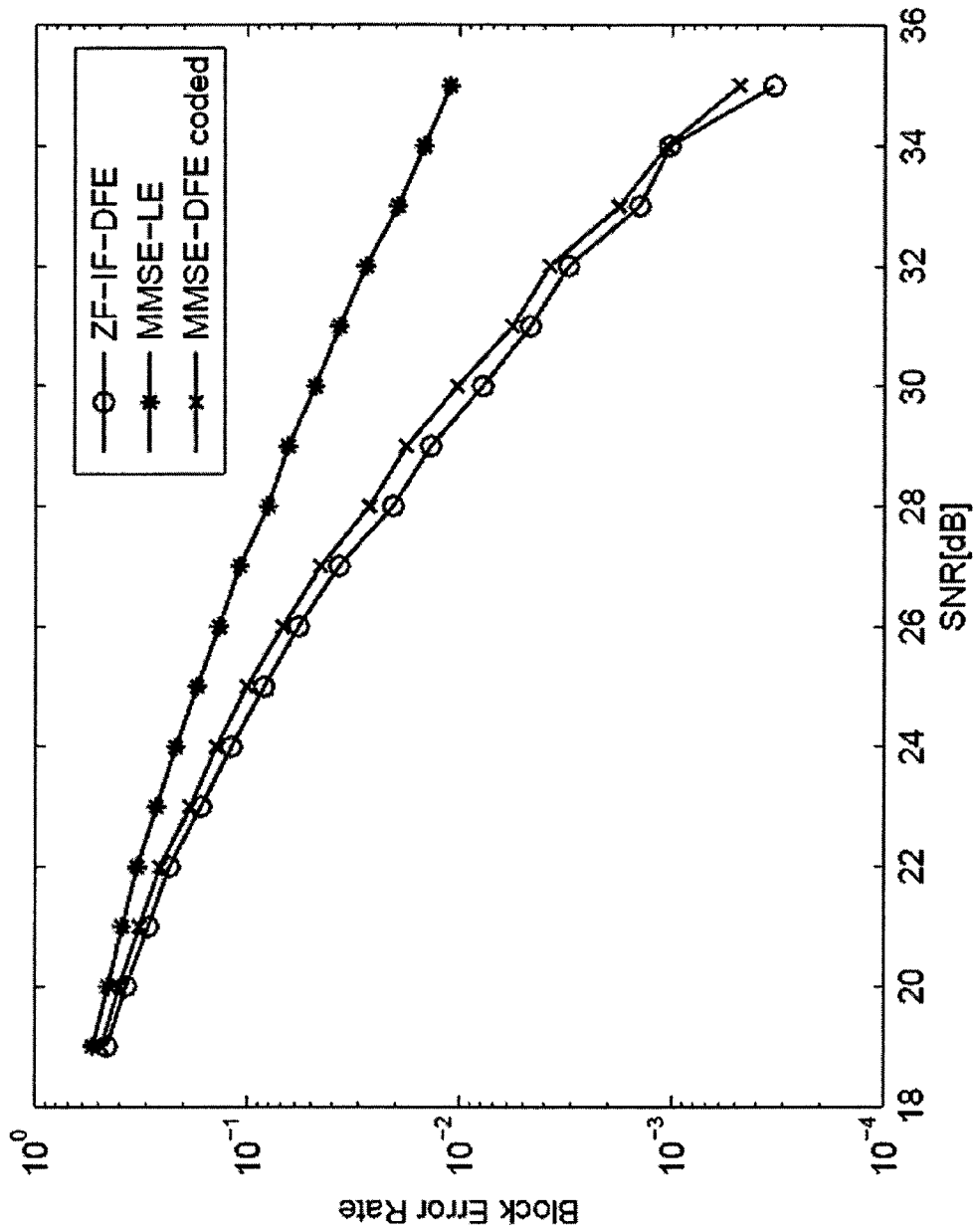
FIG. 10 illustrates another non-limiting example of block error rate over SNR calculated for transmission systems with 4-taps complex channel and implementing, respectively, MMSE linear equalizer, coded DFE, un-coded DFE and for the transmission systems configured in accordance with certain embodiments of the presently disclosed subject matter.

FIG. 10 illustrates another non-limiting example of block error rate over SNR calculated for the case of 4-taps random fading channel. For each transmission system the channel coefficients are chosen independently according to a circularly symmetric complex normal distribution. The variance of the taps decays exponentially, such that the variance of each tap is 4 times smaller than that of the previous tap. Since $SNR_{norm}$ is not defined for such a model, non-coded transmission cannot be compared with coded transmission in a fair manner. Therefore the comparison has been provided only between the block error rates of ZF-IF-DFE, MMSE-LE and MMSE-DFE coded vs. SNR.

The results show that ZF-IF-DFE is slightly better than MMSE-DFE coded for the exemplified channel model.

ZF-IF-DFE equalization has the advantage of allowing block decoding before applying the feedback loop which prevents error propagation and therefore results in a bigger coding gain than can be achieved by decoding the output of the feedback loop. However, the noise enhancement caused by FFE in ZF-IF-DFE equalization is always greater than the noise enhancement caused by the FFE in the MMSE-DFE scheme. When the additional coding gain achieved by IF is greater than the noise enhancement, it causes the ZF-IF-DFE to outperform the MMSE-DFE scheme. For most channels this is the case, but for some channels the noise enhancement is too large, and the use of IF equalization cannot be justified.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the claims associated with the present invention.

The invention claimed is:

1. A method of operating a communication system, the method comprising:
    dividing a data sequence to be transmitted into a plurality of data blocks;
    encoding one or more data blocks with one or more linear systematic cyclic codes thus giving rise to encoded data blocks;
    transmitting said encoded data blocks over an ISI transmission channel;
    upon receiving, applying a linear integer-forcing (IF) equalization to the received data blocks, wherein applying the linear IF equalization comprises equalizing a channel response to impulse response followed by integer-valued filtering;
    processing the output of the IF equalization thereby detecting for each encoded data block a valid codeword with maximal likelihood of decoding, wherein the valid codeword is a result of cyclic convolution of a respective transmitted codeword with a filter with integer-valued coefficients; and
    reconstructing the data blocks using the respective detected valid codewords.

2. The method of claim 1 wherein encoding is provided for all data blocks among the plurality of data blocks, and wherein the method further comprises padding, before encoding, a predefined number of predefined symbols at the end of each data block.

3. The method of claim 1 further comprising finding a good integer-valued filter for providing the IF equalization.

4. The method of claim 1, wherein the reconstructing is provided with the help of decision-feedback equalization agreed with integer-valued filtering.

5. The method of claim 1 wherein transmitting is provided with no channel state information.

6. The method of claim 1 wherein the number of blocks in the plurality of data blocks corresponds to a target transmission rate, and wherein the plurality of data blocks comprises a first set of data blocks and a second set of data blocks, and wherein encoding is provided to the data blocks from the second set, the method further comprising:
    padding a predefined number of predefined symbols at the end of each data block, wherein padding to the data blocks from the second set is provided before encoding;
    mapping, before transmitting, the data blocks from the first set and the encoded data blocks from the second set to $2^M$-PAM constellation points with the help of natural labeling;
    upon receiving, applying a linear integer-forcing (IF) equalization to the received data blocks; and
    reducing the output of IF equalization modulo-2 before processing for codeword detection.

7. The method of claim 6 wherein a data sequence of N·R bits is divided into the first set of data blocks comprising M−1 data blocks of N bits and the second set of data blocks comprising one data block of N·r bits, where M is an integer corresponding to a target $2^M$-PAM constellation, and 0<r<1.

8. The method of claim 1 wherein the integer-forcing equalization is provided with the help of IF equalizer selected from the group comprising zero-forcing feed-forward IF equalizer and Minimum Mean Square Error feed-forward IF equalizer.

9. A communication system configured to cause a transmitter, a receiver and a transmission channel to implement the following procedures:
    dividing a data sequence to be transmitted into a plurality of data blocks;
    encoding one or more data blocks with one or more linear systematic cyclic codes thus giving rise to encoded data blocks;
    transmitting said encoded data blocks over an ISI transmission channel;
    upon receiving, applying a linear integer-forcing (IF) equalization to the received data blocks, wherein applying the linear IF equalization comprises equalizing a channel response to impulse response followed by integer-valued filtering;
    processing the output of the IF equalization thereby detecting for each encoded data block a valid codeword with maximal likelihood of decoding, wherein the valid codeword is a result of cyclic convolution of a respective transmitted codeword with a filter with integer-valued coefficients; and
    reconstructing the data blocks using the respective detected valid codewords.

10. A storage system configured to cause a transmitter, a receiver and a transmission channel to implement the following procedures:
    dividing a data sequence to be transmitted into a plurality of data blocks;
    encoding one or more data blocks with one or more linear systematic cyclic codes thus giving rise to encoded data blocks;
    transmitting said encoded data blocks over an ISI transmission channel;
    upon receiving, applying a linear integer-forcing (IF) equalization to the received data blocks, wherein applying the linear IF equalization comprises equalizing a channel response to impulse response followed by integer-valued filtering;
    processing the output of the IF equalization thereby detecting for each encoded data block a valid codeword with maximal likelihood of decoding, wherein the valid codeword is a result of cyclic convolution of a respective transmitted codeword with a filter with integer-valued coefficients; and
    reconstructing the data blocks using the respective detected valid codewords.

11. A communication system comprising a transmitter operatively connected to a receiver with the help of ISI transmission channel, wherein
    the transmitter is configured to divide a data sequence to be transmitted into a plurality of data blocks; to encode one or more data blocks with one or more linear systematic cyclic code thus giving rise to encoded data blocks; and to transmit said encoded data blocks over the ISI transmission channel; and
    the receiver is configured to apply a linear integer-forcing (IF) equalization to the received data blocks, wherein applying the linear IF equalization comprises equalizing a channel response to impulse response followed by integer-valued filtering; to process the output of the IF equalization thereby detecting for each encoded data block a valid codeword with maximal likelihood of decoding, wherein the valid codeword is a result of cyclic convolution of a respective transmitted codeword with a filter with integer-valued coefficients; and to reconstruct the data blocks using the respective detected valid codewords.

12. The communication system of claim 11 wherein the transmitter is configured to provide encoding for all data blocks among the plurality of data blocks, and wherein the transmitter is further configured to pad, before encoding, a predefined number of predefined symbols at the end of each data block.

13. The communication system of claim 11 wherein the receiver is configured to provide reconstruction with the help of decision-feedback equalization agreed with integer-valued filtering.

14. The communication system of claim 11 wherein the transmitter is configured without channel state information.

15. The communication system of claim 11 wherein the transmitter is configured to divide a data sequence to be transmitted into a plurality of data blocks such that a number of blocks in the plurality of data blocks corresponds to a target transmission rate, and such that said plurality of data blocks comprises a first set of data blocks and a second set of data blocks, and wherein the transmitter is further configured to provide encoding to the data blocks from the second set, to pad a predefined number of predefined symbols at the end of each data block, wherein padding to the data blocks from the second set is provided before encoding; and to map the data blocks from the first set and the encoded data blocks from the second set to $2^M$–PAM constellation points with the help of natural labeling; and
wherein the receiver is further configured to reduce the output of IF equalization modulo-2 before processing for codeword detection.

16. The communication system of claim 11 wherein the receiver comprises an equalizer selected from the group comprising zero-forcing feed-forward integer-forcing equalizer and Minimum Mean Square Error feed-forward integer-forcing equalizer.

17. A storage system being configured as the communication system of claim 11.

18. A receiver configured to receive via an ISI channel one or more data blocks encoded with one or more linear systematic cyclic code,
wherein the receiver is further configured to apply a linear integer-forcing (IF) equalization to the received data blocks, wherein applying the linear IF equalization comprises equalizing a channel response to impulse response followed by integer-valued filtering;
to process the output of the IF equalization thereby detecting for each encoded data block a valid codeword with maximal likelihood of decoding,
wherein the valid codeword is a result of cyclic convolution of a respective transmitted codeword with a filter with integer-valued coefficients; and
to reconstruct the data blocks using the respective detected valid codewords.

19. The receiver of claim 18, wherein the IF equalizer comprises a linear feed-forward equalizer series-connected to a front end of integer- valued filter.

20. The receiver of claim 19 wherein the reconstruction means comprise a decision-feedback equalizer agreed with the integer-valued filter.

21. The receiver of claim 18, wherein the IF equalizer is selected from the group comprising zero-forcing feed-forward integer-forcing equalizer and Minimum Mean Square Error feed-forward integer-forcing equalizer.

22. A method of equalization in a communication system with ISI channel, the method comprising:
encoding a data block with an additional zero padding with a systematic linear cyclic code,
transmitting the encoded data block through an ISI channel with additive white Gaussian noise at a receiver;
applying a linear feed-forward integer-forcing equalizer thereby transforming the channel into a FIR filter with integer coefficients;
reducing the filter output modulo q, where q is the cardinality of the ring over which the cyclic code is defined;
detecting a closest codeword to the filtered output vector, wherein the closest codeword is a result of cyclic convolution of a respective transmitted codeword with a filter with integer-valued coefficients; and
reconstructing original data block from the detected codeword.

23. A method of operating a receiver with additive white Gaussian noise in a transmission system with ISI channel, the method comprising:
receiving an encoded data block with an additional zero padding, wherein the encoding provided with a systematic linear cyclic code;
applying to the received encoded data block a linear feed-forward integer-forcing equalizer, wherein applying the linear IF equalization comprises equalizing a channel response to impulse response followed by integer-valued filtering;
processing the output of the IF equalization thereby detecting a valid codeword with maximal likelihood of decoding, wherein the valid codeword is a result of cyclic convolution of a respective transmitted codeword with a filter with integer-valued coefficients; and
reconstructing the data blocks using the respective detected valid codeword.

24. A computer program product implemented on a non-transitory computer readable medium and comprising computer readable program code embodied therein to cause the computer to execute instructions to operate a receiver with additive white Gaussian noise in a transmission system with ISI channel, the instructions comprising:
receiving an encoded data block with an additional zero padding, wherein the encoding provided with a systematic linear cyclic code;
applying to the received encoded data block a linear feed-forward integer-forcing equalizer, wherein applying the linear IF equalization comprises equalizing a channel response to impulse response followed by integer-valued filtering;
processing the output of the IF equalization thereby detecting a valid codeword with maximal likelihood of decoding, wherein the valid codeword is a result of cyclic convolution of a respective transmitted codeword with a filter with integer-valued coefficients; and
reconstructing the data blocks using the respective detected valid codeword.

* * * * *